Patented Aug. 16, 1932

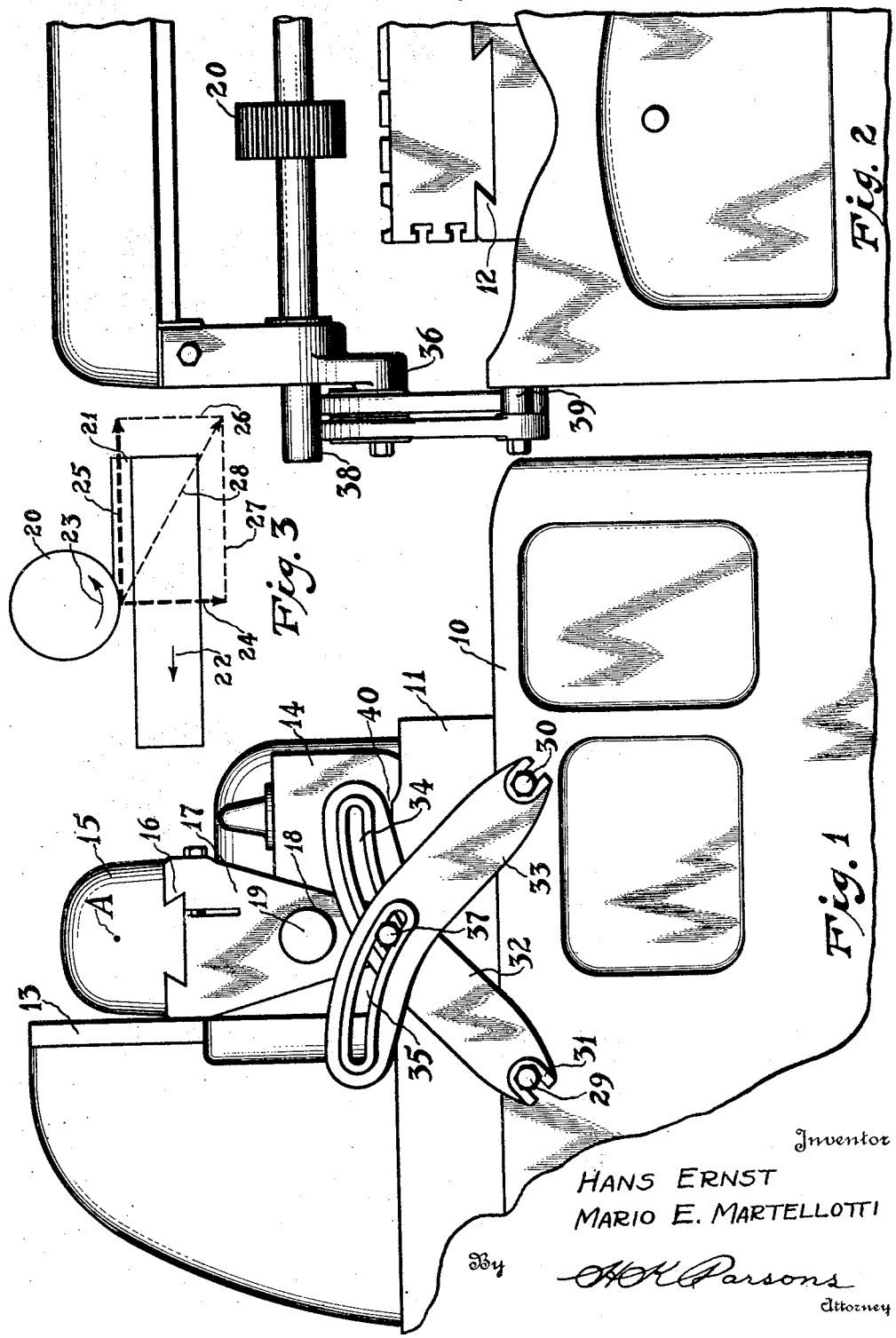

1,872,431

UNITED STATES PATENT OFFICE

HANS ERNST AND MARIO E. MARTELLOTTI, OF CINCINNATI, OHIO, ASSIGNORS TO THE CINCINNATI MILLING MACHINE COMPANY, OF CINCINNATI, OHIO, A CORPORATION OF OHIO

MILLING MACHINE

Application filed July 12, 1929. Serial No. 377,877.

This invention relates to improvements in a milling machine and particularly to an improved assembly thereof.

An object of this invention is the provision of improved means and an improved method of bracing the tool support to reduce vibration and eliminate chatter and consequent chatter marks from work pieces.

Another object of the invention is to provide a milling machine that is simple in construction, neat in appearance, rigid to a degree whereby chatter marks on the work piece are reduced to a minimum.

Another object of the invention is to provide a device of this class, that may be easily adjusted and requires a minimum number of parts to obtain proper rigidity during operation.

Another object of the invention is the provision of improved means to counteract the torsional stresses and strains in the machine and parts during operation, to prevent springing or distortion of the parts under certain heavy service conditions.

A further object is the provision of arcuate shaped adjustable bracing members of such form to satisfactorily clear adjacent projecting portions of the machine in all of the adjusted positions of the parts.

A still further object of the invention is the provision of means so arranged as to lie in a plane substantially parallel with the plane of the resultant force of the forces acting during operation of a tool on a work piece to properly fix and anchor the cutter relative to the support for the work piece.

Other objects and advantages of the present invention should be readily apparent by reference to the following specification, considered in conjunction with the accompanying drawing forming a part thereof, and it will be understood that any modifications may be made in the specific details of construction and combination and arrangement of parts hereinafter described, within the scope of the appended claims, without departing from or exceeding the spirit of the invention.

In the drawing, Figure 1 is a fragmentary front elevation of a device embodying the improvements of this invention.

Figure 2 is a side elevation of the device shown in Figure 1, and

Figure 3 is a diagram of the forces involved in a device of this invention.

Throughout the several views of the drawing, similar reference characters are utilized to denote same or corresponding parts.

The numeral 10 designates the bed or support of a machine tool having reciprocally mounted thereon a table 11, guided in its reciprocation by the ways 12 formed on the bed 10. Rising from the bed is the upright or column 13 for the spindle carrier 14, having rotatably mounted therein a spindle. Carried by the spindle carrier 14 and movable transversely of the upright or column 13 is the over-arm 15 formed with ways 16 for a support 17. The support 17 is provided with an opening 18 for receiving one end of an arbor 19, which is suitably connected to and driven by the spindle, as is usual in this art. Suitable means, not shown, are utilized for reciprocating the table 11 longitudinally of the bed 10, as well as for rotating the spindle and arbor 19.

The foregoing description is characteristic of the construction of machines and devices as commercially practiced in the art pertaining to devices of this nature and in the present instance forms no part of the invention.

In the past, it has been customary to brace or support the over-arm and arbor support, in an endeavor to rigidly support the said arbor so that the tool or cutter 20, mounted thereon, would not vibrate to produce chatter marks or uneven surfaces on work pieces. It has been found, however, that under certain conditions with heavy cuts and in making or forming unusual parts, the vibration is not eliminated and consequently chatter marks are left on the finished surfaces of the work pieces. One of the causes of this vibration is the tendency of the work, while traveling against the rotation of the cutter or tool, to force or spring the cutter in the direction of its travel, together with its support and that part of the over-arm immediately adjacent to and carrying the said support. This springing takes place about an axis substantially at the center of the mass of the over-arm, as shown on the drawing at the point A. Continued rotation of the cutter removes a portion of the work piece, when said cutter and cutter support tend to spring back to their normal position, thus setting up a state of oscillation for vibration about the axis "A". This springing or vibration about the axis "A" is very small—in fact, hardly discernible without suitable measuring instruments, but leaves ridges or marks on the work piece. This invention, as stated above, is to rigidly brace or support the tool or cutter and its support against the thrust of the moving work piece, to prevent the cutter, the cutter support and over-arm from springing and vibrating and thereby eliminate chatter marks from the work.

To best understand the problems involved and the difficulties to be overcome, attention is specifically invited to Figure 3, diagrammatically showing the forces at work. As viewed in Figure 3, the work piece is moving to the left, as indicated by the arrow 22 thereon, and the cutter 20 is rotating in counter-clockwise direction, as indicated by the arrow 23 thereon. Under these conditions, there is a force acting in a downward direction of a given amplitude, as indicated by the vector 24, as well as a force acting to the right of said vector of a magnitude of from two to three times, more or less, that acting downward, as indicated by the vector 25. To get the resultant force of these two forces, it is necessary to complete the parallelogram by means of the parallel lines 26 and 27, from which the resulting force, vector 28, is obtained. From this it will be seen, with a force acting in the direction of vector 28, the best possible bracing of the tool or cutter and its support against the forces involved may be had to eliminate vibration of the tool and consequently chatter marks from the work piece.

In practice, bolts or fastening means 29 and 30 are carried by the bed or support, each of which receive one of the bifurcated ends 31 of brace arms 32 and 33. Each of these arms is provided at its other end with an arcuate slot 34 and 35, the axes of which slots intersect one another at a point considerably below the axis of the spindle and arbor. The arbor support 17 is therefore extended to and beyond this point of intersection, as shown at 36, through which a bolt or fastening member 37 extends for securing the arms 32 and 33 to the support 17.

By comparing the general direction of extent of arm 33, in Figure 1, with the direction of vector 28, in Figure 3, it will be noted that they extend in substantially parallel planes and that the arm 33 will be in the best position to properly support and rigidly hold the cutter in relation to the work on the table. It must therefore follow that the vibrations will be substantially lessened, if not eliminated, and that chatter marks will be reduced to a minimum and the best surface produced on a work piece.

In practice, the arbor frequently extends beyond the support 17 and lies between the extended portion of the arms 32 and 33, which extend beyond the point of intersection and bolt or fastening member 37. The arcuate slots 34 and 35 and, consequently the arcuate coutour of the body of the arms provide a very satisfactory arrangement so that when the arbor is elevated to a position above that shown in Figure 1 and the arms shifted in their position to intersect one another at a point nearer the other end of the arcuate slots therein, the extended arbor 38 will be clear of the said arms. This is very important in the successful utilization of the improved structure disclosed herein.

Heretofore, the arms 32 and 33, and as is generally used today, extend from the bed 10 to the over-arm 15, having a connection intermediate their ends to the support 17. This construction necessitated the complete removal of the arms from the machine, when it was necessary to remove or change the cutter or when the machine was being set up for a different size or kind of work. By the present improvement it is not necessary to remove these heavy cumbersome arms or braces but by merely removing the bolt or fastening means 37 and loosening the fastening means 29 and 30, the arms 32 and 33 may be respectively swung or folded about bolts 29 and 30 as pivots and dropped down out of the way. At this time, brace arm 33 would rest on the head of the bolt or fastening means 29, while the brace arm 32 would be supported by the spacer 39 between the arm 33 and the bed 10. It will also be noted that the brace arms 32 and 33 are secured to the arbor support at a point in vertical alignment with the axis "A" and the axis to the arbor 19 but at a substantially greater distance from the said axis "A" than the arbor is spaced therefrom. By this construction, considerable leverage is obtained for the brace arms 32 and 33, thereby securely anchoring and holding the cutter or tool relative to the table and effectively eliminating oscillation or vibration of the cutter, arbor, arbor support and over-arm about the said axis "A". From this, it will be seen that adjustment of the machine may be made with very little trouble and in a minimum of time, as compared with the old method of bracing the arbor.

It has been found, in practice, in the majority of cases that a single arm extending substantially parallel to the direction of the resulting force vector, or as shown in Figure 3 for example brace 33, is sufficient to overcome the tendency of the tool to vibrate and to eliminate the chatter marks from the work. This will result in the elimination of one of the arms and provide an unobstructed end of the table, for example end 40 of the table 11, upon which the index base, not shown, is usually mounted, thereby facilitating the use of index mechanism and minimizing the time required to perform a specific operation, since the table will not need to be extended as far from the cutter as is necessary with the old style and method of bracing the over-arm support.

While the invention has been described in connection with a machine tool having a fixed base or bed for supporting a reciprocating table, it is to be understood that the improved braces can be applied with equal facility to what is known as the knee and column type machine. In this type machine, the knee which supports the reciprocating table would correspond to the bed here illustrated and the chief difference between these machines being that the spindle is generally stationary in the knee and column type machine as respects adjustment relative to the column, while the knee is movable toward and from the spindle for adjusting the table and work carried thereby relative to said spindle.

From the foregoing description it is believed that the inherent advantages and the satisfactory solution of the problems involved in bracing the arbor will be clearly understood.

What is claimed is:

1. In a machine tool organization the combination of a support for a reciprocating table, clamping means extending from the reciprocating table support, an arbor for a rotating tool above said support, an arbor support, the arbor extending beyond the arbor support, brace arms each having one end bifurcated to receive the clamping means extending from the reciprocating table support and the other ends overlapping one another adjacent the arbor support at a point below the arbor, said overlapping ends being arcuate shaped and provided with a slot therein, and removable adjustable means extending through the slots in the brace arms into the arbor support, the arcuate shape of the arms permitting the arbor to be adjusted vertically and the brace arms to be secured to the arbor support at any point within the range of its vertical adjustment without the brace arms and extended portion of the arbor interfering with one another.

2. The combination of a column, a reciprocating table, a support carried by the column for the table, a unit carried by and shiftable vertically of the column, an over-arm carried by the unit, means carried by the unit for rotatably supporting a cutter above the table, a support for the rotating cutter means depending from the over-arm, the support extending below the rotating cutter means, and a brace arm having one end secured to the reciprocating table support and the other end secured to the portion of the support extending below the rotating cutter means.

3. The combination with a bed, a column rising therefrom, a unit carried by the column and shiftable relative thereto, an over-arm carried by the unit, a rotatable arbor for the cutter extending from the unit and overlying the bed, an arbor support depending from the over-arm through which the arbor extends, the arbor support having an extension below the arbor, a pair of brace arms having one of their ends connected to the extension on the arbor support, and a common fastening means extending through the ends of the brace arms into the extension on the arbor support.

4. The combination with a bed, a column rising therefrom, a unit carried by the column and shiftable relative thereto, an over-arm carried by the unit, a rotatable arbor for the cutter extending from the unit and overlying the bed, the axes of the over-arm and arbor lying in vertically spaced parallel planes, an arbor support depending from the over-arm through which the arbor extends, the arbor support having an extension below the arbor, a pair of brace arms having one of their ends connected to the bed and their other ends connected to the extension on the arbor support, and a common fastening means extending through the ends of the brace arms into the arbor support, the axis of the fastening means lying in a plane parallel with the axes of the arbor and over-arm and in vertical alignment therewith but spaced a greater distance from the said axis of the over-arm than the axis of the arbor is spaced therefrom.

5. The combination of a bed, a column rising therefrom, a shiftable unit carried by the column, an over-arm carried by the shiftable unit, an arbor extending from the unit, an arbor support depending from the over-arm through which the arbor extends, the arbor support being provided with an extension below the arbor, brace arms, means individually securing one end of the brace arms to the bed and a removable common means for securing the other ends of the brace arm to the extension of the arbor support, the brace arms being adapted when the common removable means has been removed to fold about their individual connections into an inoperative position.

6. In a machine tool organization the combination with a bed, a table reciprocably supported by the bed, a column rising from the bed above the table, a unit vertically shiftable relative to the column and in a zone above the table, an over-arm carried by the unit, an arbor extending from the unit and overlying the table, an arbor support depending from the over-arm for supporting the arbor, the axes of the over-arm and arbor extending in vertically spaced parallel planes, the arbor support being provided with an extension below the arbor and a brace arm having a connection with the bed and a connection with the extension on the arbor support, the connection of the brace arm with the arbor support being in vertical alignment with the axes of the arbor and over-arm but spaced a greater distance from the axis of the over-arm than the axis of the arbor therefrom whereby considerable leverage is afforded the brace arm for rigidly supporting and anchoring the arbor relative to the reciprocating table.

7. In a milling machine the combination with a support for a reciprocating table and rotating means carrying a tool mounted in operative relation to the table, of a support member through which the rotating means extends, an extension depending from the support member between said rotating means and the table, and an inclined brace arm connected at one end to said extension and at the other end to said table support to prevent bodily movement of said rotating means relative to said table support.

8. In a machine tool organization the combination with a bed, a table for supporting a work piece reciprocably mounted on the bed, a column rising from the bed above the table, a rotatable cutter spindle carried by the column, a cutter arbor projecting therefrom and overlying the table, an over-arm carried by the column and extending over the table parallel to the arbor, an arbor support depending from the over-arm for journaling the outboard end of said arbor, a cutter mounted on the arbor for operation on a work piece carried by the table whereby a force results in a downward direction towards the work as well as in a direction perpendicular thereto and means extending in the direction of the resultant of these forces for supporting the cutter against bodily movement relative to the table support comprising a rigid brace arm, one end of which is attached to the arbor support at a point below the axis of the cutter, and the other end attached to the table support.

In witness whereof, we have hereunto subscribed our names.

HANS ERNST.
MARIO E. MARTELLOTTI.